(12) United States Patent
Archambault et al.

(10) Patent No.: US 8,620,898 B2
(45) Date of Patent: Dec. 31, 2013

(54) PROXY SERVER FOR APPLICATION ON MOBILE DEVICE

(75) Inventors: Martin-Luc Archambault, Montreal (CA); André-Philippe Paquet, Verdun (CA); Heikki Koivikko, Montreal (CA)

(73) Assignee: Wajam Internet Technologies Inc., Montreal (CA)

( * ) Notice: Subject to any disclaimer, the term of this patent is extended or adjusted under 35 U.S.C. 154(b) by 0 days.

(21) Appl. No.: 13/472,078

(22) Filed: May 15, 2012

(65) Prior Publication Data

US 2013/0179430 A1    Jul. 11, 2013

Related U.S. Application Data

(63) Continuation-in-part of application No. 13/400,086, filed on Feb. 19, 2012, and a continuation-in-part of application No. 13/352,957, filed on Jan. 18, 2012, and a continuation-in-part of application No. 13/346,342, filed on Jan. 9, 2012.

(51) Int. Cl.
*G06F 17/30* (2006.01)
*G06F 7/00* (2006.01)

(52) U.S. Cl.
USPC .......................................... 707/711; 707/741

(58) Field of Classification Search
USPC ....................................................... 707/711
See application file for complete search history.

(56) References Cited

U.S. PATENT DOCUMENTS

| | | | |
|---|---|---|---|
| 6,278,992 B1 * | 8/2001 | Curtis et al. ................. | 707/711 |
| 6,873,993 B2 * | 3/2005 | Charlesworth et al. ....... | 707/740 |
| 6,968,348 B1 * | 11/2005 | Carone et al. ................. | 707/696 |
| 7,657,523 B2 | 2/2010 | Ebanks | |
| 7,827,176 B2 | 11/2010 | Korte et al. | |
| 7,886,000 B1 * | 2/2011 | Polis et al. .................... | 709/203 |
| 7,958,104 B2 | 6/2011 | O'Donnell | |
| 8,019,743 B2 | 9/2011 | Ebanks | |
| 8,121,999 B2 | 2/2012 | Hansen et al. | |
| 8,140,566 B2 | 3/2012 | Boerries et al. | |
| 2008/0133754 A1 * | 6/2008 | Smyth et al. ................. | 709/226 |
| 2009/0204601 A1 | 8/2009 | Grasset | |
| 2011/0093498 A1 | 4/2011 | Lunt et al. | |
| 2011/0179025 A1 * | 7/2011 | Chuang ......................... | 707/728 |
| 2011/0264648 A1 * | 10/2011 | Gulik et al. ................... | 707/722 |
| 2011/0314049 A1 | 12/2011 | Poirier et al. | |

OTHER PUBLICATIONS

Horowitz & Kamvar, "The Anatomy of a Large-Scale Social Search Engine", Apr. 26-30, 2010, Raleigh, North Carolina, 10 pages.
Nelson, "Can adding friends on Facebook grow your brain?", Mother Nature Network, [online], [retrieved on Oct. 18, 2011].

* cited by examiner

*Primary Examiner* — James Trujillo
*Assistant Examiner* — Pavan Mamillapalli
(74) *Attorney, Agent, or Firm* — Benoît & Côté Inc.

(57) ABSTRACT

The present document describes a method for presenting modified information obtained from the internet on an application on a mobile device. The mobile device is set to communicate with the internet through a proxy server. A user of the mobile device is registered on a social network from which indexed search content specific to the user's connections on the social network are obtained. The method comprises: modifying, based on the indexed search content specific to the user's connections, an output for the application from an internet server to produce a modified output for the application; and sending the modified output for the application to the mobile device for presentation in the application on the mobile device.

14 Claims, 6 Drawing Sheets

PRIOR ART

PROXY SERVER FOR APPLICATION ON MOBILE DEVICE

CROSS-REFERENCE TO RELATED APPLICATIONS

This application is filed under 37 CFR 1.53(b) as a continuation-in-part application of U.S. patent application Ser. No. 13/400,086 filed Feb. 19, 2012 and U.S. patent application Ser. No. 13/352,957 filed Jan. 18, 2012 and U.S. patent application Ser. No. 13/346,342 filed Jan. 9, 2012. This application claims priority under 35 USC §120 or 365(c) of U.S. patent application Ser. No. 13/400,086 filed Feb. 19, 2012 entitled "SYSTEM AND METHOD FOR SEMANTIC ANALYSIS OF SOCIAL NETWORK USER ACTIVITIES" and U.S. patent application Ser. No. 13/352,957 filed Jan. 18, 2012 entitled "METHOD AND SYSTEM FOR RANKING RESULTS AND PROVIDING LISTS OF EXPERTS FROM SOCIAL NETWORKS" and U.S. patent application Ser. No. 13/346,342 filed Jan. 9, 2012 and entitled "METHOD AND SYSTEM FOR AGGREGATING SEARCHABLE WEB CONTENT FROM A PLURALITY OF SOCIAL NETWORKS AND PRESENTING SEARCH RESULTS", the specifications of which are hereby incorporated herein by reference in their entirety.

BACKGROUND (a) Field

The subject matter disclosed generally relates to applications for mobiles devices. More particularly, the disclosure relates to using a user's social networks in the context of the applications for mobile devices.

(b) Related Prior Art

Tremendous changes have been occurring in the World Wide Web (the "Web") that influence our everyday lives. For example, online social networks have become the new meeting grounds. The development of such online social networks touch countless aspects of our everyday lives, providing instant access to people of similar mindsets, and enabling us to form partnerships with more people in more ways than ever before.

One of the more useful features of the Web and associated forms of communication such as e-mail, instant messaging, chat rooms, social networks and forums is the access to information that is useful in everyday work and social lives. There exists a substantial amount of information accessible on the Web. However, the information obtained by searching the Web is often generic and does not account for the searcher's level of education, location, socioeconomic status or the like. The response to a search of the Web is typically presented to the user by relevancy to the search request and/or other similar criteria which are based the wording of the search request. More often than not, the user is required to review a large amount of information that is not in feet relevant to the user's request. For instance, the user's background or knowledge in the subject matter may not match that of many of the search request results. Some information may be too detailed or technical while other information may be too generic. Likewise, if a user submits a query to a message board, blog, forum or similar on-line interactive site, many of the responses to the user's request will be from people who come from different backgrounds with different tastes and varying levels of knowledge in particular areas. This is particularly true for queries that are social in nature, wherein the responses to the request are more opinion than fact. Although some responses could be highly relevant, a large number of the responses can have low usefulness or relevance to the user's request. A user could also submit inquiries to their friends and family through e-mail, instant messaging or similar methods of communication. However, the responses may be sporadic, have no organization and may be repetitive of other requests made within the social network. Therefore, it is with respect to these considerations and others that the embodiments described herein were made.

There is therefore a need to change how people collect, find and share content on the Web.

SUMMARY

According to an embodiment, there is provided a method for presenting to a user, modified information obtained from the internet on an application on a mobile device. The user is registered on the social network and has connections thereon. The method comprising:

indexing, by an adaptation server, data related to users registered on a social network to produce indexed data;

receiving, at the adaptation server, a proxy request to add the adaptation server as a proxy server for applications requiring access to the internet from the mobile device;

receiving an application access request along with a user identifier from the mobile device, after the proxy request is accepted by the adaptation server;

using the application access request and the user identifier, performing, by the adaptation server, a search on the indexed data specific to the user's connections to obtain indexed search content specific to the user's connections on the social network;

receiving, at the adaptation server, an output for the application from an internet server in response to the application access request;

modifying, by the adaptation server, the output for the application based on the indexed search content; and sending the modified output for the application to the mobile device for presentation in the application on the mobile device.

According to an aspect, the modifying comprises showing, in a reserved space on the application, information derived from the indexed search content specific to the user's connections on the social network.

According to an aspect, the information derived from the indexed search content comprises content shared by the user's connections relating to the context of the application According to an aspect, the modifying includes adding one or more of friends' recommendations, likes, check-ins, posts, tweets, shares, photos/videos, friends' comments, friends' reviews, friends' ratings in the output for the application.

According to an aspect, the application access request comprises a search query and the output for the application comprise internet search results.

According to an aspect, the modifying includes adding new search results from the indexed data that were not returned by the internet server.

According to an aspect, the modifying includes removing one or more of the search results prior to sending them to the mobile device for display in the application.

According to an aspect, the modifying includes changing the order in which the search results are presented and sending the reordered search results to the mobile device for display in the application.

According to an aspect, the modifying includes indicating presence or location of a user's connection in one of the search results.

According to an aspect, the method further comprises receiving, at the internet search server, location information indicating an approximate location of the mobile device.

According to an aspect, the modifying comprising filtering the search results based on the approximate location of the mobile device.

According to an aspect, the method further comprises receiving the search query from the mobile device and forwarding the search query to an internet server prior to receiving the search results from the internet server.

According to an aspect, the modifying the output for the application comprises at least one of: removing results, changing the order in which the search results are presented, indicating presence or location of a user's connection, indicating location of the mobile device, check-ins to a location or web site by the user's connections, rating by the user's connections, recommendations for purchases by the user's connections, and comments by the user's connections.

According to another embodiment, there is provided an adaptation server for presenting to a user, modified information obtained from the internet on an application on a mobile device. The adaptation server is set on the mobile device as a proxy server for applications on the mobile device requiring access to the internet. The user is registered on the social network and has connections thereon. The adaptation server comprises:

an input for receiving an application access request along with a user identifier;
an indexing engine for indexing data related to users registered on the social network to produce indexed data;
a context adaptation engine, using the application access request and the user identifier, for performing a search on the indexed data specific to the user's connections to obtain indexed search content specific to the user's connections on the social network, and modifying the output for the application based on the indexed search content; and
an output for sending the modified output for the application to the mobile device for presentation in the application on the mobile device.

According to another embodiment, there is provided a method for presenting modified information obtained from the internet on an application on a mobile device. The mobile device is set to communicate with the internet through a proxy server. A user of the mobile device is registered on a social network from which indexed search content specific to the user's connections on the social network are obtained. The method comprises:

based on the indexed search content specific to the user's connections, modifying an output for the application from an internet server to produce a modified output for the application; and
sending the modified output for the application to the mobile device for presentation in the application on the mobile device.

According to another embodiment, there is provided a method for presenting information obtained from the internet on an application on a mobile device, the mobile device being set to communicate with the internet through a proxy server, a user of the mobile device being registered on a social network and having connections (a user's connections) on the social network, the method comprising:

based on the user's connections, modifying an output for the application from an internet server to produce a modified output for the application; and
sending the modified output for the application to the mobile device for presentation in the application on the mobile device.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
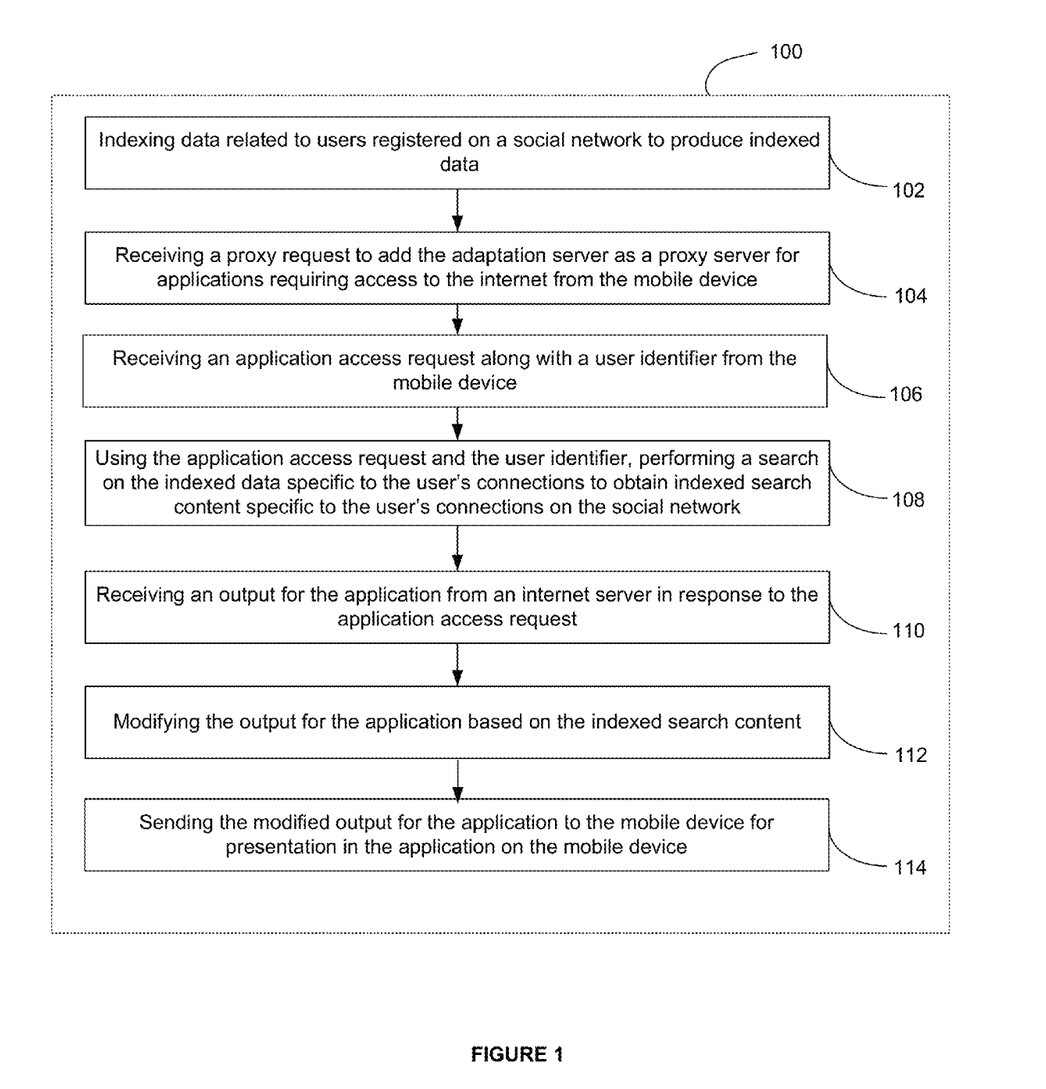
FIG. 1 illustrates a flowchart showing a method for presenting, to a user, modified information obtained from the internet on an application on a mobile device according to an embodiment.

Referring now to the drawings, and more particularly to FIG. 1, a flow chart illustrates an embodiment of a method 100 for presenting, to a user, modified information obtained from the internet on an application on a mobile device. The user is registered on the social network and has connections thereon. Method 100 comprises indexing, by an adaptation server, data related to users registered on a social network to produce indexed data (step 102); receiving at the adaptation server, a proxy request to add the adaptation server as a proxy server for applications requiring access to the internet from the mobile device (step 104); receiving an application access request along with a user identifier from the mobile device, after the proxy request is accepted by the adaptation server (step 106); using the application access request and the user identifier, performing, by the adaptation server, a search on the indexed data specific to the user's connections to obtain indexed search content specific to the user's connections on the social network (step 108); receiving, at the adaptation server, an output for the application from an internet server in response to the application access request (step 110); modifying, by the adaptation server, the output for the application based on the indexed search content (step 112); and sending the modified output for the application to the mobile device for presentation in the application on the mobile device (step 114).

Figure 2:
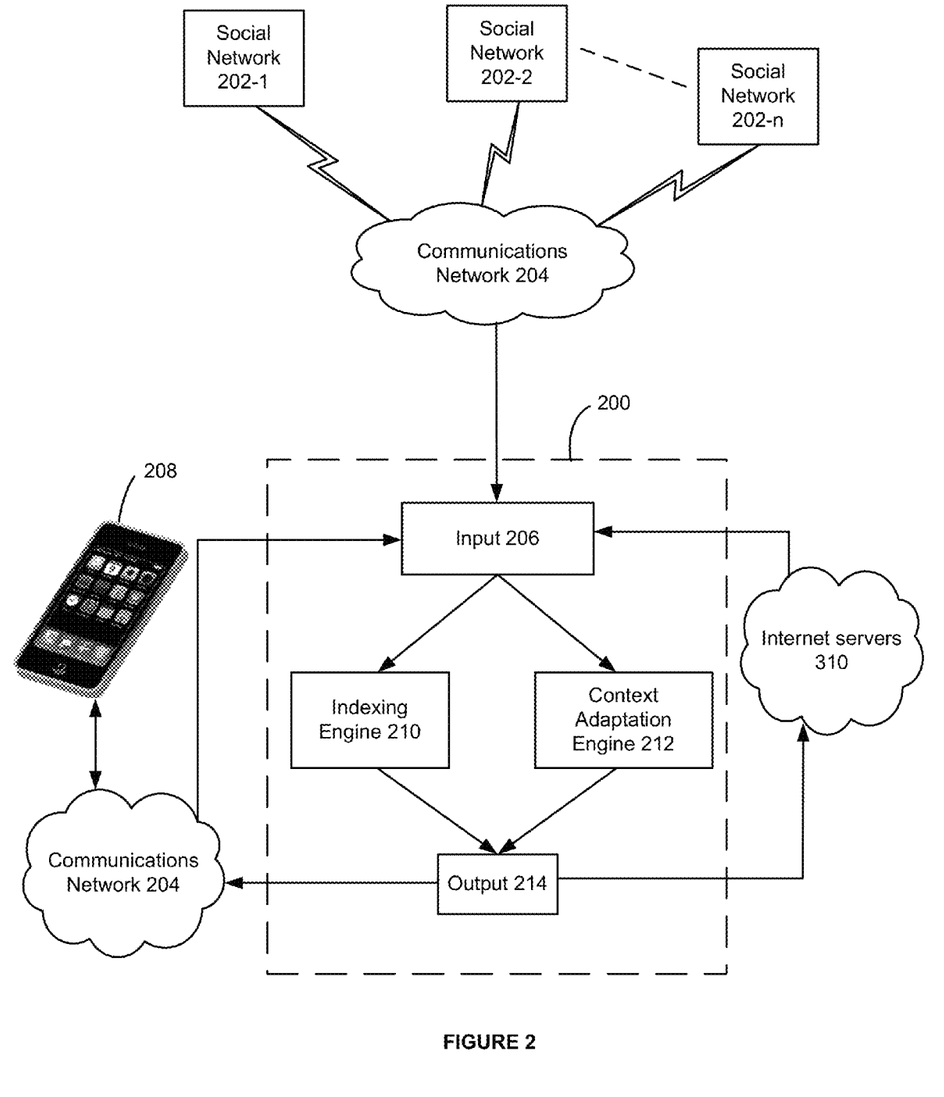
FIG. 2 is a block diagram of an exemplary adaptation server for presenting modified search results on a mobile device, in accordance with an embodiment.

Now turning to FIG. 2, there is shown is a block diagram of an exemplary adaptation server 200 and its immediate operating environment for presenting modified search results on a mobile device 208, in accordance with an embodiment.

In an embodiment, the modified search results are displayed in the existing applications provided/installed on the mobile device 208 e.g. Safari® and MAPS® on an IPHONE® etc. without having to install new applications in order to use the service. In one embodiment, the service may be activated by adding the adaptation server 200 as a proxy server, whereby search results are modified by the proxy server in accordance with indexed data obtained from the user's social networks, as will be described in detail below.

In one embodiment, adding adaptation server 200 as a proxy server may cause the mobile device 208 to address future queries by the application (i.e., application access requests which may be a search queries in an example) to the proxy/adaptation server 200 and receive the output for the application (e.g., search results in response to a search query) from the proxy/adaptation server 200 instead of connecting directly with the internet servers (or search engines) 310. An example is shown in FIG. 3a.

Figure 3A:
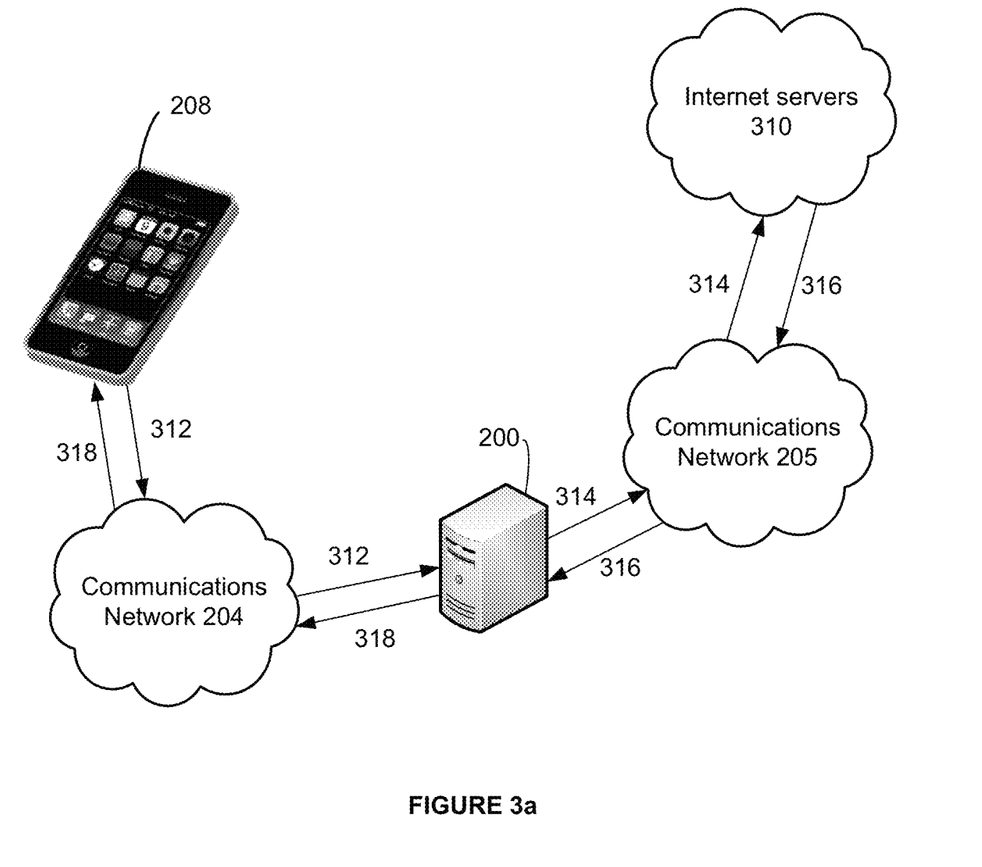
FIG. 3a is a block diagram illustrating the routing of search queries and search results through the proxy server, in a non-limiting implementation of the present embodiments.

FIG. 3a is a block diagram illustrating the routing of search queries and search results through the proxy/adaptation server 200, in a non-limiting implementation of the present embodiments. In the example of FIG. 3a, the proxy/adaptation server 200 intercepts both the application access requests and the outputs for the application. When the user initiates an application access request at the mobile device 208, the application access request may be sent over a communications network 204 to the proxy/adaptation server 200 as indicated by arrows 312. The proxy/adaptation server 200 may then forward the application access request to the internet servers (e.g., search engines in the case when it is a search query) as indicated by arrows 314 via the communications network 205. The output for the application is returned by the internet servers 310 are then returned to the proxy/adaptation server 200 as indicated by arrows 316.

In an embodiment, the output for the application may be modified at the proxy/adaptation server 200 and forwarded to the mobile device 208 as indicated by arrows 318 via the communications network 204. The modification is intended to include any change in the presentation of the content of the application on the mobile device using a user's connection on a social network. For example, for a web site which present information (e.g., Wikipedia), the presentation of the information on the application on the mobile device may be modified by showing an information bar at the top of the user display which displays the content shared by the user's connections on the subject of the information being presented. The modification is therefore content and context specific; the proxy/adaptation server 200 detects the context being presented and modifies the presentation of the information based on the context and the user's connection. In the specific context of a "search type" application, the modification may include one or more of: adding one or more new search results, removing one or more search results, substituting/overriding one or more of the search results, changing the order in which the search results are presented etc. In an embodiment, the modifications are based on indexed data obtained from the user's social network, as will be described in detail herein below.

Figure 3B:
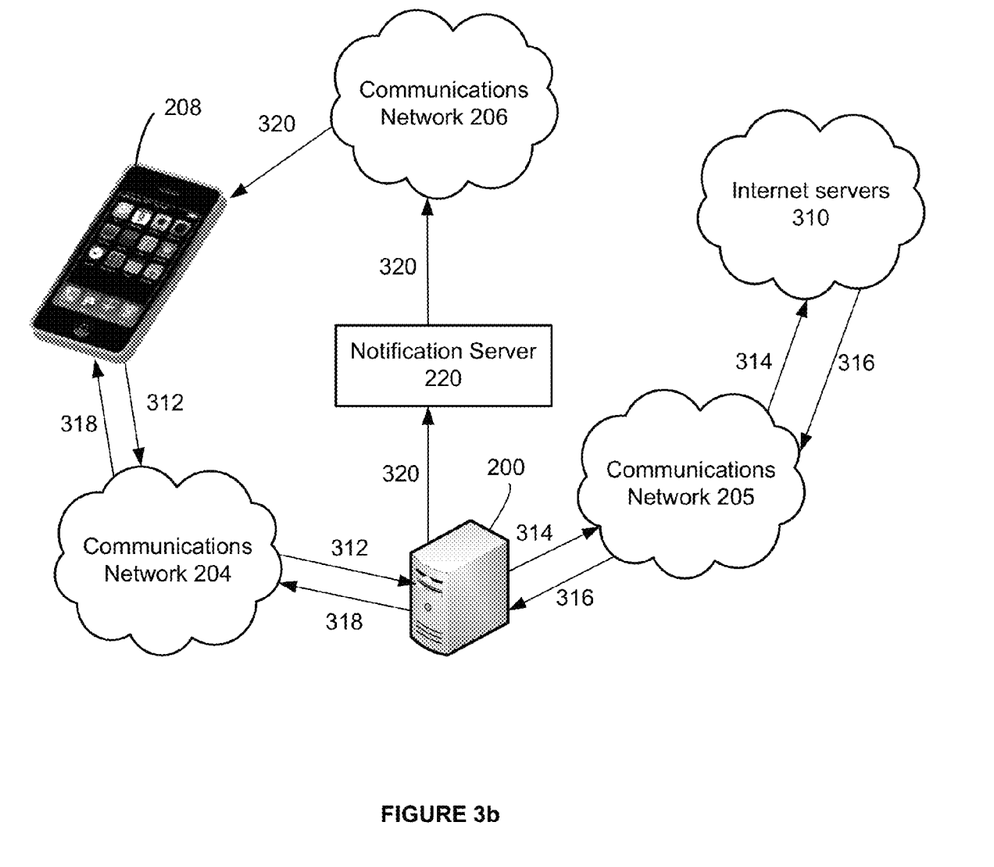
FIG. 3b is a block diagram illustrating an embodiment where a notification server sends messages related to a user's connections to the mobile device over a notification channel without modifying the messages.

Now referring to FIG. 3b, another implementation is shown. In this implementation a notification server 220 that communicates over a notification channel is introduced. What differs in this context is that when the output for the application is returned by the internet servers 310, and then returned to the proxy/adaptation server 200 as indicated by arrows 316, for certain types of messages or data, a notification is sent to notification server 220 and then forwarded over communications network 206 as indicated by arrows 320. The notification channel can be any type of network protocol-based push notification or a wireless messaging channel.

This implementation is useful in circumstances where the data from the users' connections is sent directly to the mobile device 208 without modification. An example where this configuration is used is when data related to a user's connections, which is sent in the context of a search (e.g., food or restaurant) performed on the mobile device 208, is transferred directly to the mobile device 208 without modification by the adaptation server 200. The notification in this case could be a text message sent to the mobile device 208 advising the user that a friend has been at/recommends/is present at/is near the restaurant which was the subject of the search.

Referring back to FIG. 2, the adaptation server 200 may comprise an input 206, an indexing engine 210, a context adaptation engine 212 and an output 214, in accordance with an embodiment. The adaptation server 200 may also include a database (not shown) or have access to an external database.

The input 206 is for receiving data from the social networks 202, the internet servers 310, and from the mobile device 208. For example, the input 206 may receive social network data relating to the users from the social networks 202, outputs for the application from the internet servers 310, and application access requests from the mobile device 208 along with a user identifier on the browser of the mobile device 208. In an embodiment, the input 206 may also receive information about the location of the user/mobile device 208. This information may be determined in a variety of different ways which are known in the art; e.g., if the "current location" option is enabled in the mobile device 208, if the user accesses the internet from a certain hot-spot, from the base-station with which the mobile device 208 is registered, etc.

The indexing engine 210 is for indexing the data related to users in the plurality of social networks 202 and thereby to produce indexed data which can be stored in a database (not shown, internal or external to the adaptation server 200).

The context adaptation engine 212 uses the user identifier for finding indexed data specific to the user's connections. The context adaptation engine 212 uses the application access request for performing a search of the indexed data specific to the user's connections/friends to obtain search content or data specific to the user's social networks (the user's social network search content). The context adaptation engine 212 may then modify the output for the application obtained from the internet servers 310 based on the user's social network search content. Examples of search content or data that may be used by the context adaptation engine 212 to modify the output for the application may include data relating to the location of the user's friends, data including recommendations, rating, comments, reviews, likes, dislikes, check-ins, posts, tweets, shares, photos/videos, etc. relating to products, services, places, subjects, etc. by the user's friends on the social networks.

Figure 4A:
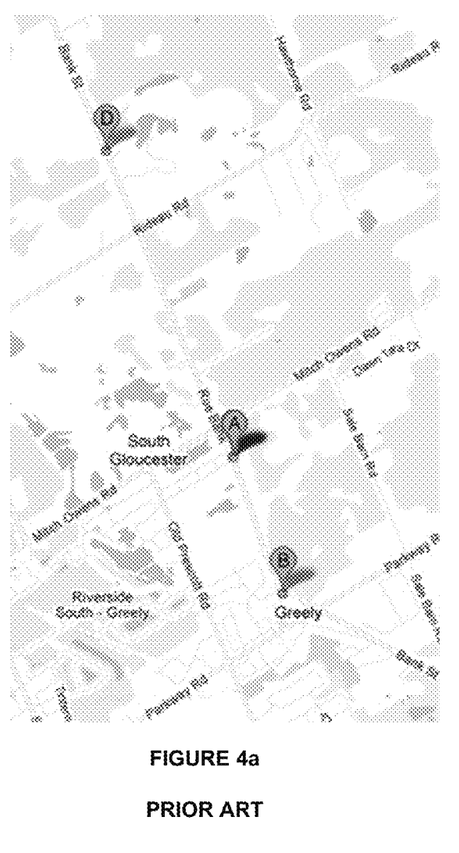
FIG. 4a illustrates search results returned in response to a search request performed in a map application using conventional routing configurations.

FIG. 4a illustrates search results returned in response to a search request performed in a map application using conventional routing configurations. If for example the user were to search for a pizza restaurant in a certain area using a map application using the conventional systems, the internet servers 310 may return all entries that match the search query, as exemplified in FIG. 4a. As shown in FIG. 4a, there are three entries that match the user's request. By contrast, if the search is performed using a proxy/adaptation server 200 in accordance with the present embodiments, the search request along with the user's identification and location may be received at the proxy/adaptation server 200, whereby the context adaptation engine 212 may search the user's indexed data received from the different social networks for entries relating to the search query which in this case is "pizza restaurants". Examples of data entries that may match the search query in the indexed data may include entries that indicate that the user's friends/connections have rated a restaurant, checked into a restaurant, recommended a restaurant, liked or disliked a restaurant, etc.

Figure 4B:
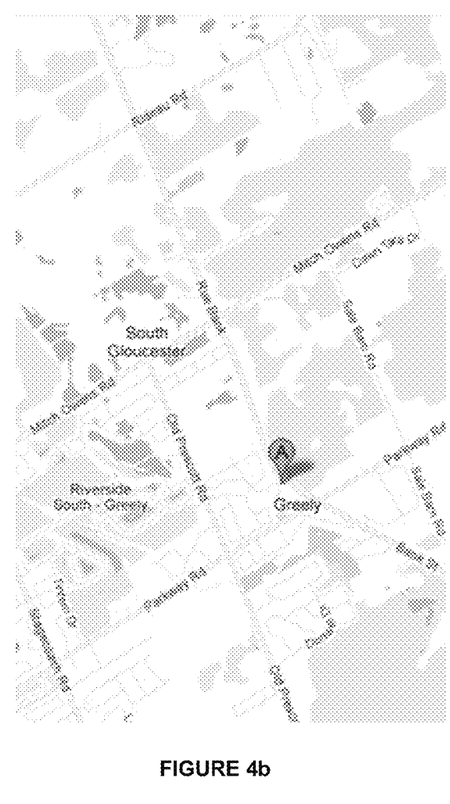
FIG. 4b illustrates an example of modified search results returned in response to a search request performed in a map application using a proxy server in accordance with the present embodiments.

The proxy/adaptation server 200 forwards the search request to the internet servers 310 and receives the search results from these as indicated in FIG. 3a. The context adaptation engine 212 may then modify the search results based on data entries of the indexed data that match the search request. For example, if the user's friends/connections have provided negative ratings for one or more of the search results, the context adaptation engine 212 may remove these entries from the search results that will be presented to the user. FIG. 4b illustrates an example of modified search results returned in response to a search request performed in a map application using a proxy/adaptation server 200 in accordance with the present embodiments. In the example of FIG. 4b the context adaptation engine 212 has modified the search results by removing results A and D of FIG. 4a to leave only one result which identified as B in FIG. 4a and A in FIG. 4b.

Figure 4C:
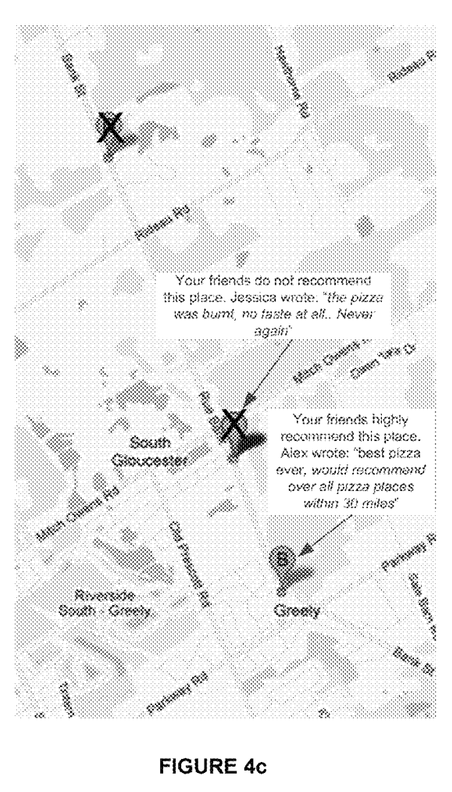
FIG. 4c illustrates another example of modified search results returned in response to a search request performed in a map application using a proxy server in accordance with the present embodiments.

FIG. 4c illustrates another example of modified search results returned in response to a search request performed in a map application using a proxy server in accordance with the present embodiments. In the example of FIG. 4c, the context adaptation engine 212 has modified the search results by displaying the user's friends' comments on results A and B, and crossing out results A and D based on negative ratings provided by the user's friends/connections while keeping result B intact. The present disclosure therefore covers any type of modifications to the search results. Indeed, adding details to the original results such as location, rating, friends who checked in, recommendations for purchases in the location, comments, etc. are all examples of such modifications.

Figure 4D:
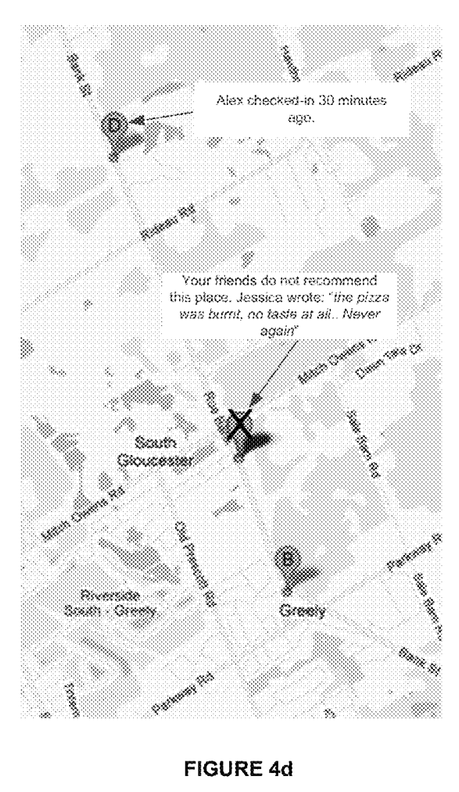
FIG. 4d illustrates another example of modified search results returned in response to a search request performed in a map application using a proxy server in accordance with the present embodiments.

FIG. 4d illustrates a further example of modified search results returned in response to a search request performed in a map application using a proxy server in accordance with the present embodiments. In the example of FIG. 4d, the context adaptation engine 212 has modified the search results to indicate that one of the user's friends/connections has checked into one of the restaurants which are returned as search results.

It should be noted that other sorts of modifications may also be included without departing from the scope of this disclosure. For example, the embodiments may be implemented in any search application such as Safari® or others, wherein the context adaptation engine 212 may modify the order in which the search results are presented. For example, the context adaptation engine 212 may present the search results that have been recommended or positively ranked by the user's friends/connections first, and/or push those that have been disliked or negatively ranked to the end. It is also possible to add new results that were not part of what has been returned by the internet servers 310. Furthermore, it is also possible to add ads, a user's connections suggestions to web pages and a user's connections' posting of an article.

The output 214 returns the modified search results to the mobile device 208 for display in the existing search application through which the search request was sent.

The proxy server 200 (aka the adaptation server) obtains data concerning a user from one or more social networks 202 over a communications network 204 such as the Internet, or any other type of wired and/or wireless communication networks. Examples of social media networks include but are not limited to: Facebook, LinkedIn, Google Plus and Google related networks, Twitter, Foursquare, MySpace, email such as Gmail and Hotmail, etc. The data obtained from the social networks includes activity data such as sharing, commenting, liking/recommending, posting, etc. In the case where the data is unstructured or semi-structured, e.g., HTML content, the adaptation server 200 may scrape the data from the remote servers of the social networks 202.

In an embodiment, the user of the mobile device 208 has to open an account and create a user profile with the adaptation server 200. The user may link their profile with the adaptation server 200 to one or more accounts at one or more social networks 202.

In an embodiment, the adaptation server 200 updates its content on a regular basis; e.g., real-time, daily and/or every time a mobile device 208 makes a request, to provide the mobile device 208 with modified search results based on real-time or nearly real-time results and recommendations from the user's friends/connections on the different social networks 202.

Adding the adaptation server 200 as a proxy server may be done in a variety of ways. One possible way is to download change/add a profile in the "Profile" settings of an iPhone®. For other types of phones, the Access Point Name (APN) settings may be changed to direct the traffic from the phone to the proxy server. Another way is to manually, change the setting of an existing wireless connection to set a proxy. For example, it is possible to change the settings of one or more Wi-Fi connections that are registered on the mobile device 208 to direct further search request through the proxy/adaptation server 200.

In another implementation, it is possible to install an application that changes the setting of data communications through the proxy server, including Wi-Fi connections, 3G connections, etc. In yet another example, the mobile network operator can set up network settings such that all traffic is routed through the proxy server. The network settings can be enabled for all users or on an individual user basis.

The mobile device 208 may include one of: a mobile telephone; a portable telecommunication device; a media playing device; a gaming system; a mobile computing device; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments, non-limiting examples of mobile devices are: smart phones, a JAVAenabled cellular telephones or personal digital assistants (PDA); any Windows-based mobile devices; any computing device that has different processors, operating systems, and input devices consistent with the device; cable set-top boxes; television sets capable of running similar applications, or connecting to the internet, or any other mobile computing device capable of performing the methods and systems described herein.

Still other embodiments of the mobile device include a mobile client machine that can be any one of the following: any one series of Blackberry, Playbook or other handheld device manufactured by Research In Motion Limited; the iPhone manufactured by Apple Computer; Windows Phone 7, HTC, Sony Ericsson, any telephone or computing device running the Android operating system, or any handheld or smart phone; a Pocket PC; a Pocket PC Phone; or any other handheld mobile device supporting Microsoft Windows Mobile Software, etc.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for presenting to a user, modified information obtained from the internet on an application on a mobile device, the user being registered on a social network and having connections thereon, the method comprising:
    indexing, by an adaptation server, data related to users registered on the social network to produce indexed data;
    receiving, at the adaptation server, a proxy request to add the adaptation server as a proxy server for applications requiring access to the internet from the mobile device;
    accepting the proxy request, and subsequently, receiving from the mobile device, an application access request along with a user identifier, a search query and an identification of an internet server to which the application request is intended to be sent, the internet server being different from the adaptation server;
    forwarding the application request along with the user identifier and search query to the internet server;
    using the application access request and the user identifier, performing, by the adaptation server, a search on the indexed data specific to the user's connections to obtain indexed search content specific to the user's connections on the social network;
    receiving, at the adaptation server, a first output for the application from the internet server in response to the application access request, the first output comprising internet search results;
    modifying, by the adaptation server, the first output for the application based on the indexed search content to produce a modified output, the modified output comprising modified internet search results defining at least one difference from the internet search results included in the first output; and
        sending the modified output for the application to the mobile device for presentation in the application on the mobile device.

2. The method of claim 1, wherein the modifying comprises showing, in a reserved space on the application, information derived from the indexed search content specific to the user's connections on the social network.

3. The method of claim 2, wherein the information derived from the indexed search content comprises content shared by the user's connections relating to a context of the application.

4. The method of claim 1, wherein the modifying includes adding one or more of friends' recommendations, likes, check-ins, posts, tweets, shares, photos/videos, friends' comments, friends' reviews, friends' ratings in the output for the application.

5. The method of claim 1, wherein the modifying includes adding new search results from the indexed data that were not returned by the internet server.

6. The method of claim 1, wherein the modifying includes removing one or more of the search results prior to sending them to the mobile device for display in the application.

7. The method of claim 1, wherein the modifying includes changing the order in which the search results are presented based on recommendations and ranking provided by the user's connections and sending the reordered search results to the mobile device for display in the application.

8. The method of claim 1, wherein the modifying includes indicating presence or location of a user's connection in one of the search results.

9. The method of claim 1, further comprising receiving, at the internet search server, location information indicating an approximate location of the mobile device.

10. The method of claim 9, wherein the modifying comprising filtering the search results based on the approximate location of the mobile device.

11. The method of claim 1, further comprising receiving the search query from the mobile device and forwarding the search query to an internet server prior to receiving the search results from the internet server.

12. The method of claim 1, wherein the modifying the output for the application comprises at least one of: removing results, changing the order in which the search results are presented, indicating presence or location of a user's connection, indicating location of the mobile device, check-ins to a location or web site by the user's connections, rating by the user's connections, recommendations for purchases by the user's connections, and comments by the user's connections.

13. An adaptation server for presenting to a user, modified information obtained from the internet on an application on a mobile device, the user being registered on a social network and having connections thereon, the adaptation server comprising:
    an input adapted to receive a proxy request from a mobile device to add the adaptation server as a proxy server for applications requiring access to the internet from the mobile device, wherein after the proxy request is accepted, the adaptation server receives from the mobile device an application access request along with a user identifier, a search query, and an identification of an internet server to which the application request is intended to be sent;
    an output adapted to forward the application access request along with the user identifier and the search query to the internet server, wherein the adaptation server is adapted to receive a first set of results returned by the internet server in response to the application request;
    an indexing engine for indexing data related to users registered on the social network to produce indexed data; and
    a context adaptation engine, using the application access request, the search query and the user identifier, for performing a search on the indexed data specific to the user's connections to obtain indexed search content specific to the user's connections on the social network, the context adaptation engine being adapted to modify the first set of results returned by the internet server based on the indexed search content to produce a second set of results, the second set of results comprising modified results defining at least one difference from the first set of results;

the output for sending the second set of results to the mobile device for presentation in the application on the mobile device.

14. A method for presenting to a user, modified information obtained from the internet on an application on a mobile device, the user of the mobile device being registered on a social network and having connections (a user's connections) on the social network, the method comprising:

indexing, by an adaptation server, data representing activities of users registered on a social network to produce indexed data;

receiving, at the adaptation server, a proxy request to add the adaptation server as a proxy server for applications requiring access to the internet from the mobile device;

providing, from the adaptation server, computer readable statements and instructions which when implemented on the mobile device cause the mobile device to direct all data traffic to the adaptation server for the applications requiring access to the internet;

accepting the proxy request, and subsequently, receiving from the mobile device, an application access request along with a user identifier, a search query and an identification of an internet server to which the application request is intended to be sent, the internet server being different from the adaptation server;

forwarding the application request along with the user identifier and search query to the internet server;

using the application access request and the user identifier, performing, by the adaptation server, a search on the indexed data specific to the user's connections to obtain indexed search content specific to the user's connections on the social network;

receiving, at the adaptation server, an output for the application from the internet server in response to the application access request, the output comprising internet search results;

modifying, by the adaptation server, the output for the application based on the indexed search content; and modifying, by the adaptation server, the output for the application based on the indexed search content to produce a modified output; and sending the modified output for the application to the mobile device for presentation in the application on the mobile device.

* * * * *